United States Patent
Shattil et al.

(10) Patent No.: US 10,469,186 B2
(45) Date of Patent: *Nov. 5, 2019

(54) COOPERATIVE INTRUSION DETECTION

(71) Applicant: Department 13, LLC, Boulder, CO (US)

(72) Inventors: Steve J Shattil, Cheyenne, WY (US); Robi Sen, McLean, VA (US)

(73) Assignee: Department 13, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,406

(22) Filed: Feb. 18, 2019

(65) Prior Publication Data

US 2019/0181967 A1     Jun. 13, 2019

Related U.S. Application Data

(63) Continuation of application No. 14/944,399, filed on Nov. 18, 2015, now Pat. No. 10,211,932, which is a (Continued)

(51) Int. Cl.
*H04B 17/309* (2015.01)
*H04W 12/02* (2009.01)
(Continued)

(52) U.S. Cl.
CPC .............. *H04B 17/309* (2015.01); *H04K 1/00* (2013.01); *H04K 3/825* (2013.01);
(Continued)

(58) Field of Classification Search
CPC ....... H04L 63/08; H04L 63/10; H04L 63/123; H04L 63/1416; H04L 63/1433; H04B 17/309; H04W 12/02; H04W 12/12
See application file for complete search history.

(56) References Cited

U.S. PATENT DOCUMENTS 5,420,910 A    5/1995   Rudokas et al.
5,604,806 A    2/1997   Hassan et al.
(Continued)

OTHER PUBLICATIONS

K. J. Ellis and N. Serinken, Radio Science, vol. 36, No. 4, pp. 585-597, Jul.-Aug. 2001.
(Continued)

*Primary Examiner* — Hee K Song
(74) *Attorney, Agent, or Firm* — Steven J Shattil

(57) ABSTRACT

A network node in a distributed network employs a surface immunoglobulin program to monitor other nodes in the distributed network and generate an alert upon detecting a suspicious activity; and pushes a free-antibody program to a requesting node petitioning to access the distributed network. The free-antibody program can include a software agent that monitors the requesting node. The free-antibody program reports detected malware and/or suspicious activity to the surface immunoglobulin program, which can enact countermeasures against the requesting node. The network node's role is based on a hierarchy of trustworthiness levels, wherein it performs at least one of monitoring other nodes, sending alerts when anomalous behavior is detected, transmitting the free-antibody software program to the requesting node, updating defensive programs, participating in consensus-based threat analysis with other nodes, identifying threats, tagging suspicious nodes, and performing countermeasures against identified threats.

26 Claims, 7 Drawing Sheets

Related U.S. Application Data continuation-in-part of application No. 14/109,928, filed on Dec. 17, 2013, now Pat. No. 9,673,920.

(60) Provisional application No. 61/738,924, filed on Dec. 18, 2012.

(51) Int. Cl.
| | |
|---|---|
| *H04W 12/12* | (2009.01) |
| *H04L 29/06* | (2006.01) |
| *H04K 1/00* | (2006.01) |
| *H04K 3/00* | (2006.01) |
| *H04K 1/04* | (2006.01) |

(52) U.S. Cl.
CPC ...... *H04L 63/1416* (2013.01); *H04L 63/1433* (2013.01); *H04W 12/02* (2013.01); *H04W 12/12* (2013.01); *H04K 1/04* (2013.01)

(56) References Cited

U.S. PATENT DOCUMENTS

| | | | |
|---|---|---|---|
| 5,826,186 A | 10/1998 | Mitchell et al. | |
| 5,995,533 A | 11/1999 | Hassan et al. | |
| 6,023,619 A | 2/2000 | Kaminsky | |
| 6,229,445 B1 | 5/2001 | Wack | |
| 6,269,246 B1 | 7/2001 | Rao et al. | |
| 6,778,025 B1 | 8/2004 | Leuthold | |
| 6,844,816 B1 | 1/2005 | Melton et al. | |
| 7,002,509 B2 | 2/2006 | Karlsson | |
| 7,230,971 B1 | 6/2007 | Beard | |
| 7,677,438 B2 | 3/2010 | DeJean | |
| 8,018,883 B2 | 9/2011 | Bowser et al. | |
| 8,046,835 B2 | 10/2011 | Herz | |
| 8,810,404 B2 | 8/2014 | Bertoncini et al. | |
| 9,121,802 B2 | 9/2015 | Kormanyos | |
| 9,438,614 B2 | 9/2016 | Herz | |
| 9,443,085 B2 | 9/2016 | Glew et al. | |
| 9,503,470 B2 | 11/2016 | Gertner et al. | |
| 2003/0095322 A1 | 5/2003 | Gehlot | |
| 2003/0110392 A1 | 6/2003 | Aucsmith et al. | |
| 2003/0234718 A1 | 12/2003 | Fujisawa et al. | |
| 2004/0083129 A1 | 4/2004 | Herz | |
| 2006/0053490 A1 | 3/2006 | Herz | |
| 2006/0181394 A1 | 8/2006 | Clarke | |
| 2007/0169194 A1 | 7/2007 | Church et al. | |
| 2008/0079540 A1 | 4/2008 | Aull et al. | |
| 2008/0084294 A1 | 4/2008 | Zhiying et al. | |
| 2009/0049546 A1 | 2/2009 | Verma | |
| 2009/0201133 A1 | 8/2009 | Bruns | |
| 2009/0305665 A1 | 12/2009 | Kennedy et al. | |
| 2010/0131751 A1 | 5/2010 | Reznik et al. | |
| 2012/0320787 A1 | 9/2012 | Sugar | |
| 2013/0305377 A1 | 11/2013 | Herz | |
| 2014/0040509 A1 | 2/2014 | Stedman | |
| 2014/0100821 A1 | 4/2014 | Leonard | |
| 2014/0146969 A1 | 5/2014 | Sadot et al. | |
| 2014/0237599 A1 | 8/2014 | Gertner et al. | |
| 2016/0156593 A1 | 6/2016 | Yan | |
| 2016/0381079 A1* | 12/2016 | Ben-Shalom | H04L 63/105 726/29 |

OTHER PUBLICATIONS

S. C. G. Periaswamy, D. R. Thompson, J. Di, "Fingerprinting RFID Tags", IEEE Transactions on Dependable and Secure Computing, Oct. 21, 2010, IEEE computer Society Digital Library.

N. Saparkhojayev and D. R. Thompson, "Matching Electronic Fingerprints of RFID Tags using the Hotelling's Algorithm," IEEE Sensors Applications Symposium, New Orleans, La., Feb. 17-19, 2009.

D. Zanetti, B. Danev, and S. Capkun, "Physical-layer identification of UHF RFID Tags", Proceedings of the Sixteenth Annual International Conference on Mobile Computing and Networking, MobiCom '10 on Sep. 20-24, 2010 in Chicago, Ill., ACM, pp. 353-364.

D. Zanetti, P. Sachs and S. Capkun, "On the Practicality of UHF RFID Fingerprinting: How Real is the RFID Tracking Problem?" Privacy Enhancing Technologies vol. 6794 of the series Lecture Notes in Computer Science pp. 97-116, 2011.

I.R. Adeyemi, N.B. Ithnin, "Users Authentication and Privacy control of RFID Card," International Journal of Scientific & Engineering Research, vol. 3, Issue 10, Oct. 2012 ISSN 2229-5518.

L. Xiao, L.J. Greenstein, N.B. Mandayam, "Using the Physical Layer for Wireless Authentication in Time-Variant Channels," IEEE Transactions on Wireless Communications, vol. 7, No. 7, Jul. 2008.

L. Xiao, N.B. Mandayam, W. Trappe, "Channel-Based Detection of Sybil Attacks in Wireless Networks," IEEE Transactions on Information Forensics and Security, vol. 4, No. 3, Sep. 2009.

W.Wang, D. Pu, A. Wyglinski, "Detecting Sybil Nodes in Wireless Networks with Physical Layer Network Coding," 2010 IEEE/IFIP International Conference on Dependable Systems & Networks (DSN).

Nguyen, Giao T., et al. "A trace-based approach for modeling wireless channel behavior." Proc. 28th Conference on Winter Simulation. IEEE Computer Society, 1996.

Ureten, Oktay, and Nur Serinken. "Wireless security through RF fingerprinting." Canadian Journal of Electrical and Computer Engineering 32.1 (2007): 27-33.

Suski II. William C., et al. "Using spectral fingerprints to improve wireless network security." IEEE Globecom 2008, Nov. 30-Dec. 4, 2008.

Ureten, O., and Nur Serinken. "Bayesian detection of Wi-Fi transmitter RF fingerprints." Electronics Letters 41.6 (2005): 373-374.

Han, et al. "Distributed Cooperative Transmission with Unreliable and Untrustworthy Relay Channels", pp. 1-13, Hindawi Pub. corp., Eurasip Journal on Wireless Comm. and Networking, vol. 2009, Article ID 740912.

Rehak, et al., "Adaptive Multiagent System for Network Traffic Monitoring", pp. 16-25, 2009 IEEE Intelligent Systems.

Ghit, et al., "Intrusion Detection in Multi-Agent Systems", INCoS 2009, SCI 329, pp. 235-255 Springer-Verlag Berlin Heidelberg 2010.

Ou, "Host-Based Intrusion detection systems adapted from agent-based artificial immune systems", Neurocomputing 88 (Jan. 2012) pp. 78-86.

Dasgupta, "Immunity-Based Intrusion Detection System: A General Framework", pp. 1-14, Jan. 2012. http:/Issrl.cs.memphis.edu/files/papers/Immune-IDS.pdf.

Jokar, "Model based intrusion for home area networks in small grids", 9 pages https://pdfs.semanticscholar.org, 2012.

* cited by examiner

COOPERATIVE INTRUSION DETECTION

CROSS-REFERENCE TO RELATED APPLICATIONS

This application is a Continuation of U.S. patent application Ser. No. 14/944,399, filed Nov. 18, 2015, now U.S. Pat. No. 10,211,892, which is a Continuation-In-Part of U.S. patent application Ser. No. 14/109,928, filed Dec. 17, 2013, now U.S. Pat. No. 9,673,920, which claims priority to Provisional Appl. No. 61/738,924, filed Dec. 18, 2012; all of which are hereby incorporated by reference in their entireties and all of which this application claims priority under at least 35 U.S.C. 120 and/or any other applicable provision in Title 35 of the United States Code.

BACKGROUND

1. Field of the Invention

Subject matter disclosed herein relate generally to network intrusion detection, and more particularly, to distributed network intrusion.

2. Introduction

The hidden-node problem occurs when two or more wireless nodes that are unable to sense each other transmit to an access point, causing interference at the access point. If the nodes employ directional antennas, the hidden-node problem is worse. Solutions to the hidden-node problem are typically implemented at the medium access control (MAC) level. For example, a Carrier Sense Multiple Access with Collision Avoidance or an ALOHA protocol may be adapted to include handshaking. However, handshaking solutions apply to nodes that belong to the same network.

Alternatively, in cognitive radio, a first network may use the same frequency band as a second network without communicating with the second network. The basic idea behind cognitive radio is opportunistic spectrum sharing by identifying under-utilized licensed bands and utilizing those bands until they are used by their licensed users. Specifically, MAC-layer messages are not shared between the networks, so the goal is to minimize interference with the second network by improving detection of potentially hidden nodes.

The hidden-node problem is typically addressed in the context of one node unintentionally interfering with communications between other nodes. There is a notable deficiency of effective solutions for situations in which the hidden node has malicious or selfish intent. For example, a common solution for a denial of service attack in which a hidden node sends a false request is MAC-based and simply provides additional validation embedded in the data transmissions.

A conventional Intrusion Detection System (IDS) monitors a network for malicious activities and/or policy violations. Intrusion detection typically employs a statistical anomaly analysis or a signature analysis. Statistical anomaly analysis creates a baseline performance metric for network traffic and then monitors the traffic for any activity outside the baseline parameters.

However, this approach is only effective for identifying activities that significantly impact overall network traffic. Also, bad packets generated in the course of normal network activity can generate false alarms.

Signature analysis identifies network traffic for predetermined (i.e., known) attack patterns, known as signatures. Many attacks have distinct signatures. However, in order for signature analysis to be effective, it is necessary to maintain an up-to-date database of attack patterns.

There are two main types of IDSs. The first type is an independent system that connects to the network via a hub, switch, or network tap and monitors packets for malicious content. The second type resides on the host and monitors system calls, logs, and file systems for suspicious activities.

In a cooperative network, a new type of IDS is required. In 2001, distributed multi-user multiple input, multiple output (MU-MIMO) was first introduced (S. J. Shattil, Pat. Appl. Ser. No. 60/286,850, filed Apr. 26, 2001), which coordinates a large number of access points (e.g., cellular base stations) distributed over a certain coverage region via a wired, optical, and/or wireless backhaul network connected to a central processor in order to form a distributed antenna system. Thus, the multiple access points can function together as a single distributed access point, referred to as a "super array." In subsequent patent filings, Distributed MU-MIMO included user terminals and relays in many different network topologies (S. J. Shattil, patent application Ser. No. 10/131,163 filed Apr. 24, 2002, now U.S. Pat. No. 7,430,257; and S. J. Shattil, patent application Ser. No. 10/145,854, filed May 14, 2002). Solutions to synchronization and calibration in Distributed-MIMO are presented in the '257 patent, the '854 application, S. J. Shattil, Pat. Appl. Ser. No. 60/598,187, filed Aug. 2, 2004, and S. J. Shattil, patent application Ser. No. 11/187,107 (now U.S. Pat. No. 8,670,390). All the references presented herein are incorporated by reference in their entireties.

Since clients in cooperative, ad-hoc, peer-to-peer, and mesh networks already perform many of the network control functions, it can be useful to provide an IDS employed as a distributed system residing on the clients.

These and other needs in the field are addressed by aspects of the present invention.

SUMMARY

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

An important motivational background for aspects of the invention is related to the study of the human body's immunological response as a distributed response mechanism.

In some aspects of the disclosure, each client device in a wireless network comprises an agent configured to communicate and cooperate with agents residing on other clients in the wireless network. Such a system can facilitate the identification of hidden nodes, better protect network resources from attacks and unauthorized access, and implement effective countermeasures. Related aspects of the disclosure are described in U.S. patent application Ser. No. 14/109,928, filed Dec. 18, 2013, which is hereby incorporated by reference in its entirety.

Some aspects of the disclosure provide for organizing multiple users distributed geographically into cooperative groups, each group functioning as an antenna array to improve sensing reliability.

In some aspects, a distributed cognitive radio system coordinates itself via local interactions between radios rather than via a centralized processing scheme. For example, there can be two stages in consensus-based cooperative spectrum sensing. In the first stage, primary users make measurements about secondary users. In the second stage, a network is established among primary users to locally exchange information in order to make a consensus determining the presence and trustworthiness of the secondary users.

By way of example, a network intrusion detection system for a distributed network can comprise a surface immunoglobulin program residing in a non-transient machine-readable medium in a trusted network node. The surface immunoglobulin program can comprise a software agent configured to monitoring other nodes and alert the network to suspicious activity. A free-antibody program resides in a non-transient machine-readable medium in a requesting node petitioning for network access. The free-antibody program comprises a software agent communicatively coupled to the surface immunoglobulin program and is configured to monitor behavior of the requesting node and warn the network of suspicious behavior. The surface immunoglobulin program can be configured to install the free-antibody program on the requesting node.

In one aspect of the disclosure, a network node in a distributed network comprises a surface immunoglobulin system configured to monitor other nodes in the distributed network and generate an alert upon detecting a suspicious activity; and a free-antibody system configured to push a free-antibody program to a requesting node petitioning to access the distributed network. The free-antibody program can comprise a software agent configured to communicatively couple to the surface immunoglobulin system while monitoring behavior of the requesting node and report detected malware and/or suspicious activity to the surface immunoglobulin system.

In one aspect, a Network Wiki knowledge system comprises a measure of trustworthiness for each node in a distributed network. The measure of trustworthiness for a particular node can be updated by other nodes, wherein updates are weighted based on each contributing node's trustworthiness. Network resources and/or network control responsibilities can be assigned to each particular node based on its trustworthiness.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific aspects thereof, which are illustrated in the appended drawings. These drawings depict only typical aspects of the invention and are not therefore to be considered to be limiting of its scope. Aspects of the invention will be described and explained with additional specificity and detail through the use of the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
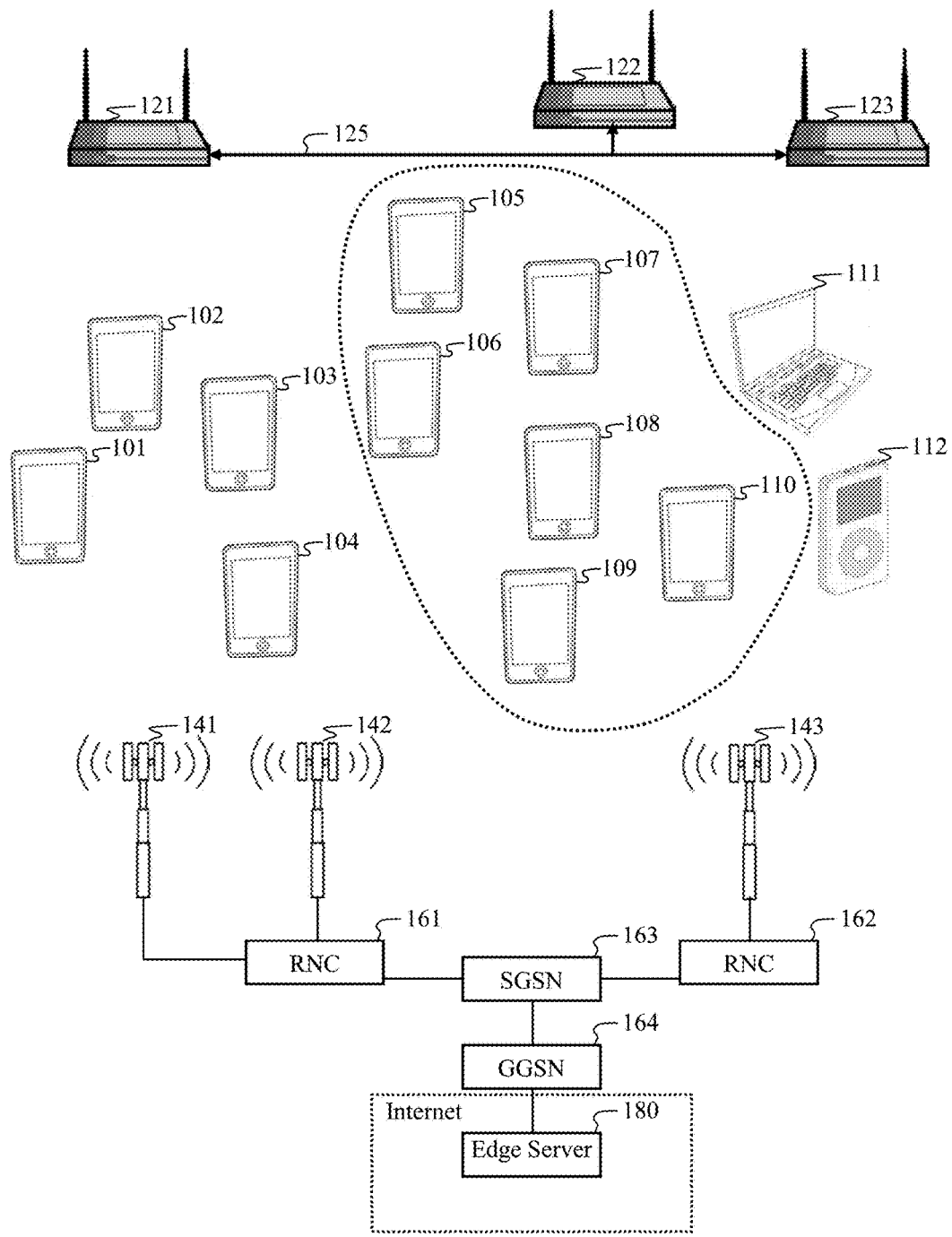
FIG. 1 is a block diagram of various network configurations in which aspects of the invention can be implemented.

FIG. 1 is a block diagram of various network configurations in which aspects of the invention may be implemented. It should be appreciated that any of various types of networks, including those that employ Cooperative MIMO, mesh networking, and/or peer-to-peer ad-hoc communications can employ aspects of the invention.

LTE wireless networks, also known as Evolved Universal Terrestrial Radio Access (E-UTRA), are being standardized by the 3rd Generation Partnership Project (3GPP) working groups. LTE is a standard for wireless communication of high-speed data based on GSM/EDGE and UMTS/HSPA network technologies. LTE Advanced is a next-generation mobile communication standard being standardized by 3GPP as a major enhancement to the LTE standard. LTE Advanced includes specifications for Cooperative MIMO.

Cooperative MIMO include a family of techniques whereby a client in a wireless system is simultaneously served by multiple access points (e.g., base stations) within its radio communication range. By tightly coordinating the transmission and reception of signals at multiple access points, Cooperative MIMO effectively exploits inter-cell interference to expand coverage, increase cell capacity, and dramatically increase data bandwidth.

Cooperative MIMO includes distributed antenna array processing techniques employed in wireless mesh networks and wireless ad-hoc networks. In wireless ad-hoc networks, multiple transmit nodes may communicate with multiple receive nodes. To optimize the capacity of ad-hoc channels, MIMO techniques can be applied to multiple links between transmitting and receiving node clusters as if the antennas in each cluster were physically connected. Contrasted to multiple antennas residing on a user device or a base transceiver station, cooperating nodes and their antennas are located in a distributed manner. In order to optimize the capacity of this type of network, techniques to manage distributed radio resources are essential. In aspects of the disclosure, resource management techniques for Cooperative MIMO may be further configured for content management, such as for load balancing and reducing congestion on fronthaul and/or radio access network (RAN) links.

According to some aspects of the disclosure, distributed computing can be employed in a Cooperative-MIMO network to coordinate network management operations, as well as media distribution. The evolution of distributed processing on multiple computing cores and the evolution of cooperation between mobile antenna systems enhances opportunities to perform cooperative work (such as sharing information storage and data processing) on multiple cores owned by different users. Aspects of the disclosure provide for collaborative network intrusion detection, collaborative authentication, collaborative threat assessment, performing collaborative malware detection (and optionally, eradication), and cooperative countermeasures, including (but not limited to) tagging a suspicious node, blocking network access to a suspicious node, disabling a suspicious node, and mounting a distributed attack (such as a distributed denial-of-service attack) against a suspicious node.

As shown in FIG. 1, client devices 101-112 can be served by one or more of various networks. By way of example, and without limitation, one or more of the client devices 101-112 can be served by a set of cooperating access points 121-123 communicatively coupled together by a fronthaul network 125. One or more of the client devices 101-112 can be served by a WWAN (e.g., a RAN) comprising cellular base stations (such as NodeB's or eNodeB's) 141-143. In one aspect, base stations 141-143 comprise radio equipment connected to the WWAN that communicates directly with WWAN-enabled client devices 101-112. In one aspect, a cluster of cooperating devices 105-110 are coupled together via WLAN links (not shown) and configured to cooperatively transmit and/or receive with other clusters (not shown), the access points 121-123, and/or the base stations 141-143.

Radio Network Controllers (RNCs), such as RNCs 161 and 162, are governing elements in the UMTS radio access network that are responsible for controlling NodeBs. For example, RNC 161 performs radio resource management and mobility management functions for base stations 141 and 142, and RNC 162 performs radio resource management and mobility management functions for base station 143. The RNCs 161 and 162 connect to a Serving GPRS Support Node (SGSN) 163 in the Packet Switched Core Network. The SGSN 163 is responsible for the delivery of data packets from and to the mobile stations within its geographical service area. Its tasks include packet routing and transfer, mobility management (attach/detach and location management), logical link management, and authentication and charging functions. A Gateway GPRS Support Node (GGSN) 164 is responsible for the interworking between the GPRS network and external packet switched networks, such as the Internet and X.25 networks.

From an external network's point of view, the GGSN 164 is a router to a sub-network because the GGSN 164 hides the GPRS infrastructure from the external network. Thus, in a conventional CDN, an edge server 180 does not see the structure of the GPRS network. However, in order to improve GPRS network efficiency, such as reducing congestion on WWAN links, aspects of the disclosure can provide for certain edge server functionality inside the GPRS network.

In one aspect of the disclosure, a WWAN client device may function as a network controller for its respective cluster. For example, client device 110 can be the network controller for the cluster comprising devices 105-110. The network controller 110 can organize the other devices 105-109 to communicate with the WWAN. The WWAN client devices 105-110 can coordinate their WWAN processing functions, and each client device may access the Internet through the GPRS network.

In some aspects of the disclosure, a cluster may comprise a wireless personal area network (WPAN) for coupling the other devices 105-109 to the master 110. The WPAN may enable a route to Internet connectivity, such as via WiFi, cellular, or other access service(s) enabled by one or more devices 105-110 in the cluster. The corresponding network connectivity information may be made available to other devices in the cluster, such as for cooperative processing, and such alternative network services may be utilized by the other client devices in the cluster.

In some aspects, the RNC 161 can employ multiple base stations 141 and 142 for communicating with each WWAN device 101-112, such as to suppress inter-user interference via coherent coordination and joint spatial multiplexing between the base stations 141 and 142. In some aspects, the access points 121-123 can be configured to jointly process signals for communication with the client devices 101-112. For example, by employing overlapping coverage areas and cooperative-MIMO processing, the set of access points 121-123 can operate together as a distributed MIMO antenna array for serving the client devices 101-112.

As will be appreciated, there is a need to ensure the integrity and security of such cooperative networks. For example, it would be useful for the access points 121-123 to be configured to detect a rogue access point. Similarly, it is useful for a WWAN system to identify a man-in-the-middle attack which employs a spoofed base station. In cooperative client-side networks, such as mesh, peer-to-peer, and other multi-hop networks, it is useful to identify a malicious node. Furthermore, aspects of the disclosure can be configured to detect malicious clients served by a cooperative network, and some aspects can be configured to identify and direct countermeasures against other wireless networks.

Some aspects disclosed herein differ from techniques employed in conventional centralized networks by avoiding the need for centralized intrusion detection. In aspects of the disclosure, sensing and processing intelligence are located at the network edge, such as to minimize latency. Collaborative processing can be performed at the network edge where processing resources are readily available and easy to scale to meet processing needs.

In aspects of the invention, a cooperative network may function like a Wiki. While a Wiki allows anyone who accesses it to contribute or modify content, Wiki-like cooperation among network nodes (i.e., a Network Wiki) allows those nodes to administer network services to other nodes in the network and maintain a database of information about each node. The knowledge system of the Network Wiki comprises information about each node, including its Health, Trustworthiness, Capabilities, and the Reliability of its connection to the network. This information can be updated by the node itself (to a limited degree) and other nodes (to a greater degree). These updates are weighted based on each contributing node's Trustworthiness.

In accordance with aspects of the invention, a Cooperative Intrusion Detection system combines the concept of Wiki with the self-healing/self-configuring capabilities of an ad-hoc network. However, instead of relying on the soft-security of Wiki, which makes damage easy to repair rather than attempting to prevent damage, aspects of the invention employs the distributed characteristics of the human body's immunological response. This strategy allows the community of users to identify malicious intent and perform counter-measures before network services are disrupted.

Specifically, the system authenticates users and identifies threats based on a biological architecture. Users authenticate each other and construct a measure of trustworthiness based on both authentication and behavior. This process mirrors how a biological system regulates healing and immune responses. In fact, the biological immune response is the model for the security functions in some aspects of the invention. For example, individual nodes perform the function of T-cells and B-cells. Macroscopic network-management messages pertaining to the over-all health of the community take the form of Interleuken-4 and Interleuken-8, which are used by the immune-response system to regulate inflammation. In the network, these messages alert nodes to an attempted attack. Microscopic network-management messages for identifying and neutralizing threats take the form of neutrifils (which direct T-cells to migrate to injuries in the body) and IgE (which tags foreign bodies for destruction).

Extending this network management scheme even further, the community of nodes may employ Genetic Algorithms to distribute services and mitigate threats, since this function reduces to an optimization problem for assigning network-administration functions of varying importance to nodes having varying degrees of Trustworthiness and Availability.

Antibodies are gamma globulin proteins produced by B-cells. They identify and neutralize foreign objects, particularly viruses and bacteria. A small region at the tip of the protein is extremely variable, allowing for a large number of antibodies. Each variant binds to a different antigen. The unique part of the antigen recognized by an antibody is called an epitope. This is similar to network attack signatures in an attack-signature database. A typical human B cell will have 50,000 to 100,000 antibodies bound to its surface. An attack-signature database may comprise millions of signatures. Each antibody binds to its associated epitopes and tags it for attack by other parts of the immune system. A particular network node may be targeted for attack—e.g., blocked from the network or disabled.

Antibodies Occur in Two Forms:
1. Free antibodies are a soluble form secreted into the blood and other fluids in the body. Free antibodies are implemented as a software agent that is distributed throughout the network. A network node may be required to accept an antibody program before it is allowed to join the network. The antibody program may eradicate viruses and/or other malware residing on the node. It may also monitor node behavior and then inform the rest of the network of any problems (e.g., it may signal the network to neutralize the node). The antibody program may shut down the node or otherwise disrupt the node's access to the network if problems are detected, or in response to a kill command from a trusted node.
2. A surface immunoglobulin is a membrane-bound form that is attached to the surface of a B-cell. It allows the B-cell to detect when a specific antigen is present in the body and triggers B-cell activation. The corollary of a surface immunoglobulin is a software agent residing on a trusted network node that monitors other nodes and alerts the network to any suspicious activity.

Figure 2:
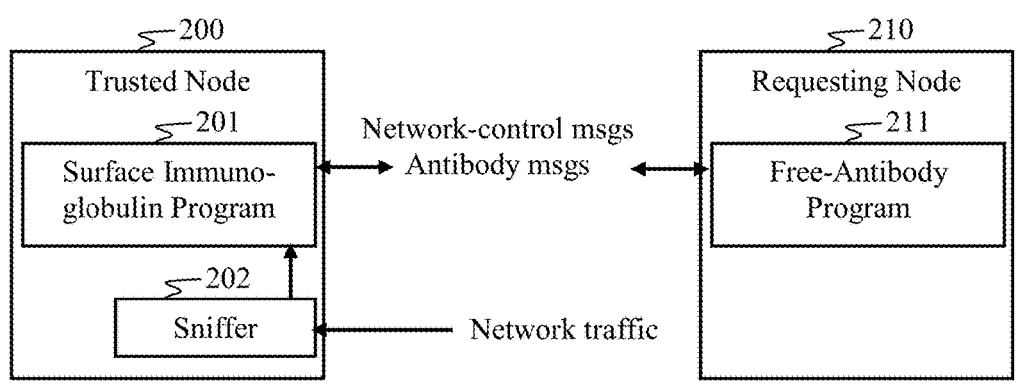
FIG. 2 is a block diagram that depicts method and apparatus aspects configured to provide for message passing between software agents residing on a trusted node and a requesting node. In some aspects, the functions disclosed herein can be implemented as instructions in software configured to program one or more general-purpose processors to operate in accordance with aspects of the invention.

FIG. 2 is a block diagram illustrating message passing between software agents residing on a trusted node 200 and a requesting node 210. A surface immunoglobulin program 201 resides on the trusted node 200, and upon being accepted by the requesting node 210, a free-antibody program 211 resides on the requesting node 210.

In one aspect of the invention, the surface immunoglobulin program 201 communicates with at least one free-antibody program 211 residing on at least one requesting node 210 via antibody messages. Furthermore, the surface immunoglobulin program 201 may communicate with other surface immunoglobulin programs (not shown) residing on other trusted nodes (not shown) via network-control messages. The surface immunoglobulin program 201 may monitor network traffic, such as via a sniffer 202 that detects communications between other nodes.

Antibodies can come in different varieties, known as isotypes, or classes. Antibody programs may come in a variety of classes. For example, some programs may scan for and eradicate viruses, some may scan for and eradicate other types of malware, and some may identify and respond to intruder nodes or types of network attacks.

The antibody isotype of a B-cell changes during cell development and activation. Immature B-cells, which have never been exposed to an antigen, are known as naïve B-cells and express only the IgM isotype in a cell surface bound form. Its corollary is a network node with low Trustworthiness. This "naïve" node's function is limited to monitoring other nodes.

B-cells begin to express both IgM and IgD when they reach maturity. The co-expression of both these immunoglobulin isotypes renders the B-cell "mature" and ready to respond to antigens. A network node with high Trustworthiness is defined as "mature" and it has additional functions, such as performing countermeasures to identified threats, as well as updating attack signatures and anti-virus and anti-malware software. Maturity may be assigned to a node via a combination of consensus authentication and monitoring of the node's behavior.

B-cell activation follows engagement of the cell-bound antibody molecule with an antigen, causing the cell to divide and differentiate into an antibody-producing cell called a plasma cell. In this activated form, the B-cell produces antibodies in a secreted form rather than a membrane-bound form. A corollary to this behavior is when a node discovers a new type of attack and sends updates to the attack signatures used by other nodes. Once a node identifies a particular threat, it may instruct other nodes to scan for that threat.

Antibodies Contribute to Immunity in Three Ways:
1. Isolation: They prevent pathogens from entering or damaging cells by binding to them. In aspects of the invention, nodes deny network access to an infected or unidentified node. The network may reconfigure itself to route information around or away from the infected or unidentified node.
2. Tagging: They stimulate removal of pathogens by macrophages and other cells by coating the pathogen. In the proposed network, a node identifies and targets an infected or malicious node as a threat, and the antibody software records the signature of any new virus, identifiers for other types of malware, and/or attack signature. The node's MAC address (which comprises the device's unique serial number) may be blacklisted to inform other nodes about the infected or malicious node.
3. Countermeasure: They trigger destruction of pathogens by stimulating other immune responses, such as the complement pathway. In the proposed network, the nodes may eradicate viruses and/or other malware in an infected node. The nodes may trigger a network-administration function that deactivates an infected or malicious node. The nodes may coordinate a DoS attack or other countermeasure to disrupt a malicious node.

Figure 3:
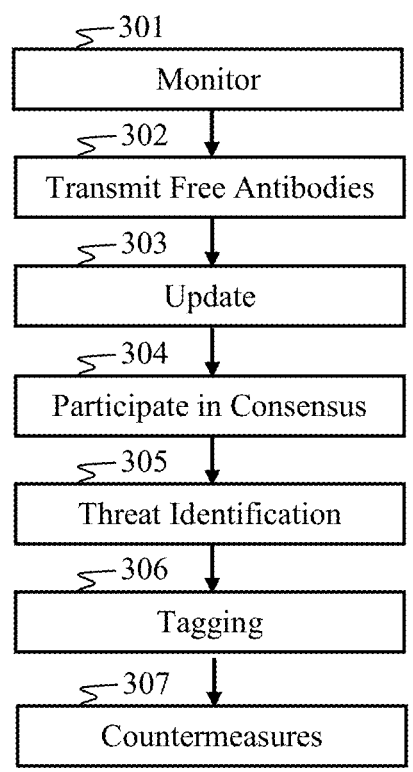
FIG. 3 is a flow diagram that depicts a method that can be performed in accordance with certain aspects of the invention. In one aspect, such methods can be performed in a distributed manner across multiple hardware devices. In another aspect, at least one of the steps can be performed by a central processor. A software program comprising instructions to perform the method can reside on one or more non-transient computer-readable mediums, such as may reside on one or more network nodes.

FIG. 3 depicts a sequence of steps 301-307 that may be performed by the surface immunoglobulin program 201. In one aspect of the invention, the sequence of steps 301-307 depicts functionality performed by nodes having progressively increasing levels of Trustworthiness.

A naïve node's function may be limited to monitoring 301 other nodes and sending alerts when anomalous or prohibited behavior is detected. A more mature node may have limited participation in authenticating requesting nodes. For example, a node that has more trustworthiness than the naïve node may transmit 302 a free-antibody program to a requesting node. A node with even higher trustworthiness may be permitted to update 303 defensive programs and signature databases.

A next level of Trustworthiness may entail participating 304 in consensus threat analysis with other nodes. Mature nodes may also identify threats 305 and tag 306 suspicious nodes. The most mature nodes (i.e., those with the highest level of Trustworthiness) may perform countermeasures 307 against identified threats.

Network analysis tools may be configured to monitor and record the types and frequency of attack signature updates in the network. In this way, network function may be analyzed and evaluated using a similar means employed in biochemical assays for disease diagnosis.

In some aspects of the disclosure, Cooperative Intrusion Detection employs software agents that reside on individual nodes. These software agents utilize data obtained from collaborative sensing, and they collaboratively process the data to characterize the behavior of nodes requesting access to the network. The software agent may be designed in accordance with the following parameters:

Persistence: The agent runs continuously on the client, and it decides when it should perform some activity.

Autonomy: The agent is configured to perform predetermined tasks, prioritize those tasks, and perform some predetermined level of decision making.

Social Ability: Agents interact with each other for sharing data and performing collaborative data processing and decision making. The agents may employ any of various formats for communicating and coordinating activities between the agents.

Reactivity: Agents perceive the context in which they are operating, and they are configured to react to events in predetermined ways based on the context.

Software agents identify and authenticate nodes requesting access to the network. In some aspects, the agents are programmed to respond to a variety of different attacks.

Figures 4A, 4B:
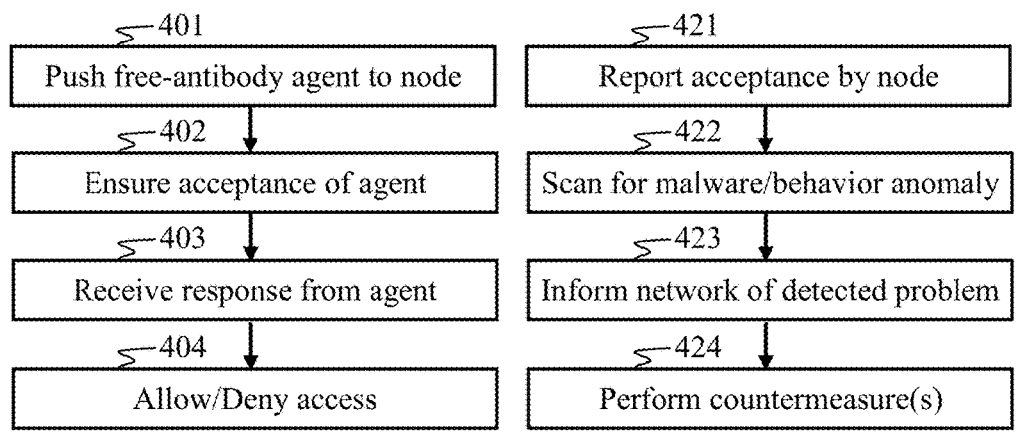
FIGS. 4A and 4B are flow diagrams that depict methods configured in accordance with aspects of the disclosure.

FIG. 4A is a flow diagram that depicts a method configured in accordance with aspects of the disclosure. A trusted network node comprising a predetermined level of trustworthiness responds to a requesting node's request for network services by pushing a free-antibody software agent to the requesting node 401. The trusted node verifies acceptance of the software agent by the requesting node 402. For example, the software agent may signal the trusted node upon installing itself on the requesting node. Upon running a malware scan and/or performing other activities to determine a threshold of trustworthiness for the requesting node, the software agent signals the trusted node. The trusted node receives a trustworthiness report 403 from the software agent and possibly from one or more other agents monitoring the requesting node. Upon receiving the report(s) 403, the trusted node makes a decision on whether to allow or deny network services to the requesting node 404.

In some aspects, the method shown in FIG. 4A can be performed by a general-purpose processor on the trusted node programmed with instructions from a surface immunoglobulin software agent residing on a non-transitory computer-readable medium. In one aspect, the decision 404 can comprise a consensus of decisions made by a plurality of trusted nodes.

FIG. 4B is a flow diagram that depicts a method according to other aspects of the disclosure. In one aspect, a free-antibody program is configured to transmit a report 421 to at least one trusted node upon being accepted by a requesting node. For example, the free-antibody program can transmit the report 421 upon successful installation on the requesting node. The free-antibody program might send an encrypted message or some predetermined code such as to ensure that its report is authentic.

The free-antibody program performs analysis of the requesting node, such as scanning for malware and/or observing its behavior 422. The free-antibody program sends the results of its analysis to the at least one trusted node 423. For example, the free-antibody program might inform the at least one trusted node if malware is detected and/or if the requesting node behaves in an anomalous or otherwise suspicious manner 423. The free-antibody program may continue to reside on the requesting node while the node receives network services, such as to periodically or continuously monitor the node. For example, a condition for receiving network services might include allowing the free-antibody program to reside on the node during the period in which services are provided, and the network may discontinue service to the node if periodic messages from the free-antibody program cease.

In the event that malware or anomalous behavior is detected, the free-antibody program might perform countermeasures 424. For example, the free-antibody program can be configured to quarantine or remove malware. In some aspects, the free-antibody program might be configured to terminate the node's connection to the network. In some aspects, the free-antibody program might be configured to disrupt the node's operations, such as to power down the node. In some aspects, the free-antibody program might coordinate with trusted nodes to mount a denial-of-service attack or some other attack on the suspicious node. In some aspects, the free-antibody program might tag the node as a threat, such as by changing the node's identifier, causing the node to transmit an alert signal, and/or causing the node to behave in some other manner that alerts the network. In other aspects, tagging can comprise a code or behavior that signals to the network that the requesting node is not a threat, and wherein the absence of such a code or behavior indicates that the node is a threat.

Figures 5A, 5B:
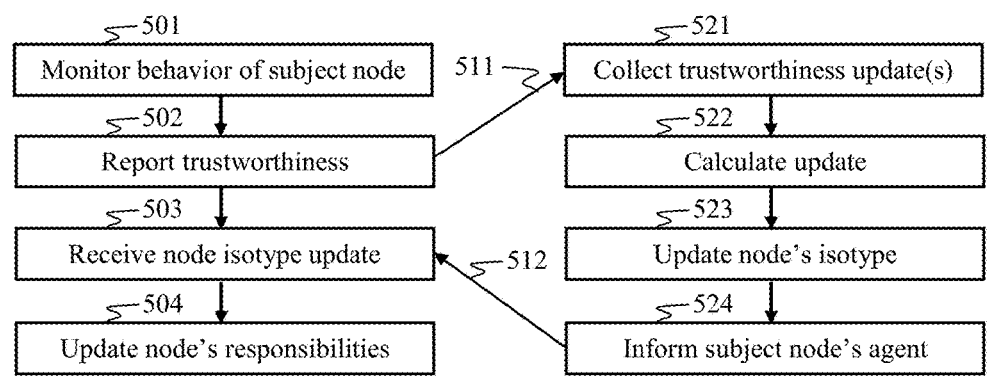
FIG. 5A is a flow diagram of a method performed by a free-antibody program residing on a subject node that has requested access to network services.
FIG. 5B is a flow diagram of a corresponding method performed by a surface immunoglobulin software agent residing on a trusted node.

FIG. 5A is a flow diagram of a method performed by a free-antibody program residing on a subject node that has requested access to network services, and FIG. 5B is a flow diagram of a corresponding method performed by a surface immunoglobulin software agent residing on a trusted node. Interactions between the methods depicted in FIGS. 5A and 5B are indicated by messages 511 and 512.

A free-antibody software agent monitors behavior of the subject node 501 and generates a trustworthiness report 502, which can be transmitted 511 to the surface immunoglobulin software agent, which collects reports from one or more subject nodes 521. In some aspects, collecting trustworthiness updates 521 can comprise collecting reports from at least one node monitoring the subject node. Based on the received reports, the surface immunoglobulin software agent calculates an update to the subject node's trustworthiness 522. The surface immunoglobulin software agent might update the subject node's isotype 523, which can provide the subject node with different privileges and/or responsibilities. Any updates to the isotype are communicated to the subject node's free-antibody software agent 524 via message 512. Upon receiving an isotype update 503, the free-antibody software agent updates the subject node's responsibilities and/or network access 504.

Figure 6:
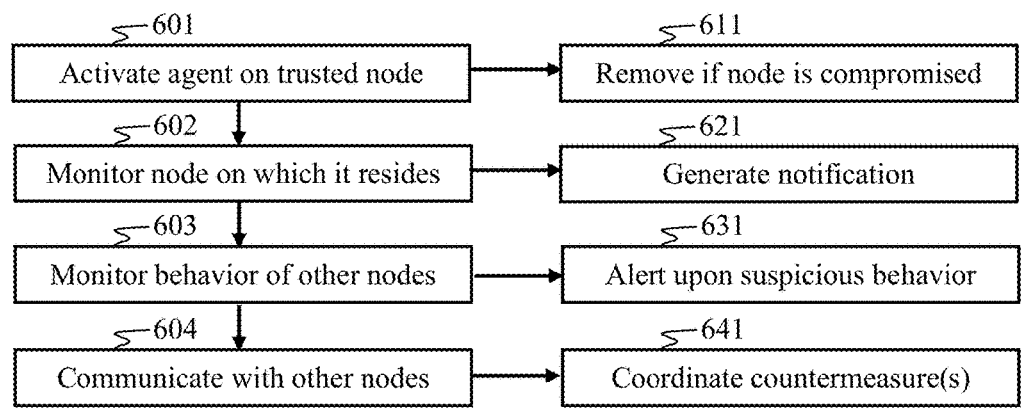
FIG. 6 is a flow diagram that depicts a method in accordance with aspects of the disclosure.

FIG. 6 is a flow diagram that depicts a method in accordance with aspects of the disclosure. In one aspect, a software agent is activated on a trusted network node 601. If the agent cannot be activated, the agent might disable or uninstall itself 611, such as to prevent the agent from being compromised. Once activated, the software agent monitors the node on which it resides 602. For example, the software agent might monitor the node's behavior and compare it to a predetermined set of anomalous behaviors. The software agent might perform periodic and/or event-based scans of the node's memory such as to detect any malware and optionally quarantine or remove any detected malware. In some aspects, the software agent might produce a report or notify the network if problems are detected 621.

The software agent also monitors other nodes 603. For example, the software agent can monitor the behavior of other nodes, such as by observing their communication patterns. In some aspects, multiple nodes can perform the monitoring and collaborate to determine suspicious activity. Upon making a determination of suspicious activity, one or more of the monitoring nodes issues an alert 631, which can inform other nodes in the network. Part of the monitoring, decision, and alert comprises communicating with other nodes 604. The nodes also communicate with each other 604 to coordinate countermeasures 641 against the suspicious node.

Figure 7:
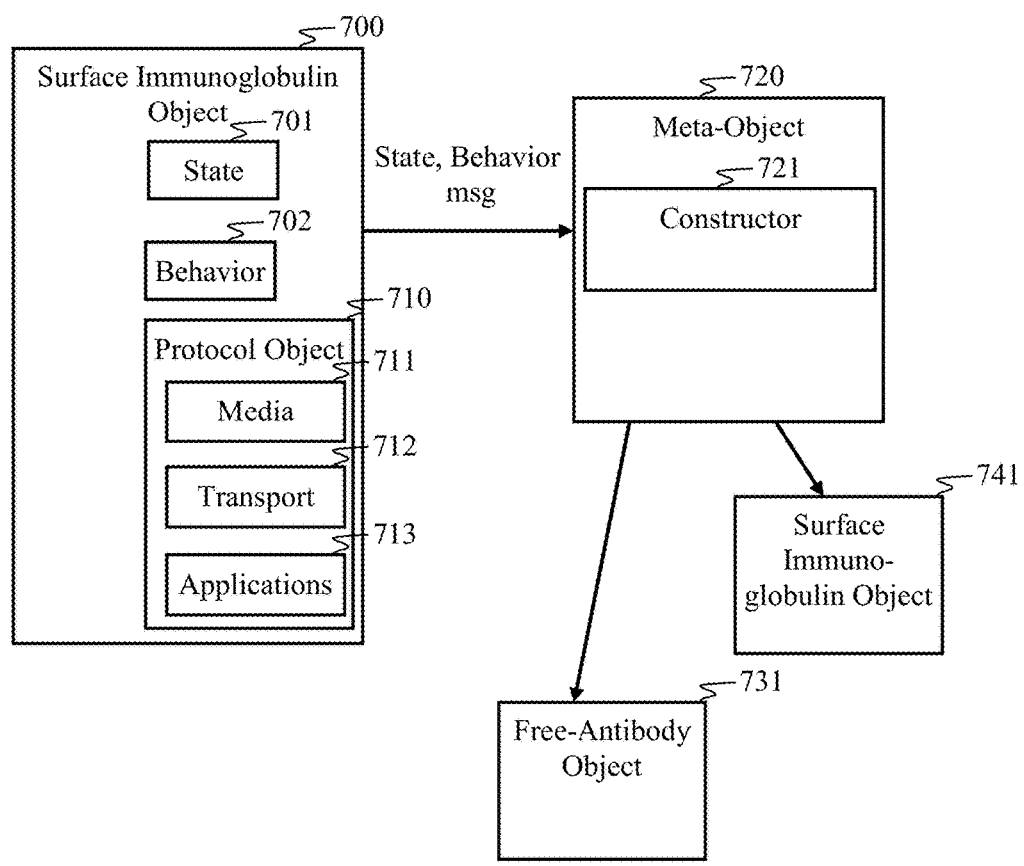
FIG. 7 illustrates at least one non-transitory computer-readable medium comprising instructions stored therein and executable by a processor to perform methods in accordance with aspects of the disclosure.

FIG. 7 illustrates functional aspects in accordance with certain methods and apparatuses disclosed herein. By way of example, such functional aspects can be implemented by instructions embodied in a software program residing on non-transitory computer-readable media. In one aspect, a surface immunoglobulin object 700 residing on a first node is configured to communicate with software objects (such as meta-object 720) residing on at least a second node, such as to instantiate objects (e.g., object 731 and 741) on the at least second node.

In object-oriented programming (OOP), an instance is a specific realization of any object. Formally, "instance" is synonymous with "object," as they are each a particular value (realization), and these may be called an instance object; "instance" emphasizes the distinct identity of the object. The creation of an instance is called instantiation. By way of example, the surface immunoglobulin object 700 sends a message to meta-object 720, which instructs a constructor 221 function to create object instance(s) 731 and/or 741 having predetermined state and behavior as indicated in a message sent by the surface immunoglobulin object 700.

In class-based programming, objects are created from classes by subroutines called constructors, and destroyed by destructors. An object is an instance of a class and may be called a class instance or class object. Instantiation is then also known as construction. An object may be varied in a number of ways. Each realized variation of that object is an instance. Each time a program runs, it is an instance of that program. That is, it is a member of a given class that has specified values rather than variables.

Some aspects can employ an interface definition language (IDL) for distributed systems. An IDL shields the client of all of the details of the distributed server object (and vice-versa). Details, such as which type of computer the object resides on, what programming language it uses, what operating system, and other platform specific issues can be concealed from the surface immunoglobulin object 700.

A language is considered object-oriented if it is object-based and also has the capability of polymorphism and inheritance. Polymorphism refers to the ability to overload the name of a function with multiple behaviors based on which object(s) are passed to it. For example, the surface immunoglobulin object 700 may be one of multiple types of surface immunoglobulin objects that are differentiated by levels of Trustworthiness, such as described with respect to FIG. 3. Thus, objects employed herein, such as the surface immunoglobulin object 700, can have different states and behaviors based on their level of Trustworthiness.

An object is an abstract data type with the addition of polymorphism and inheritance. An object has state (data) 701 and behavior (code) 702. The meta-object 720 is an object that manipulates, creates, describes, or implements other objects (including itself). Similarly, other types of objects can be employed to create (and destroy) surface immunoglobulin objects and/or free-antibody objects. For example, a factory object (not shown) simply creates other objects. Upon receiving an instruction from a the surface immunoglobulin object 700, the meta-object 720 instantiates the free-antibody object 731 and/or the surface immunoglobulin object 741 according to parameters in the instruction.

In some aspects, the surface immunoglobulin object 700 may comprise a protocol object 710. Protocol objects are components of a protocol stack that enclose network communications within an object-oriented interface. The protocol stack is an implementation of a computer networking protocol suite. The terms are often used interchangeably. Strictly speaking, the suite is the definition of the protocols, and the stack is the software implementation of them.

In some practical implementations, protocol stacks can be divided into three major sections: media 711, transport 712, and applications 713. A particular operating system or platform will often have two well-defined software interfaces: one between the media 711 and transport 712 layers, and one between the transport 712 layer and applications 713.

It should be appreciated that the apparatus and method aspects of the disclosure are not intended to be limited to specific aspects disclosed herein. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the methods of the disclosure may be distributed to users on a distribution medium, such as a SIM card, a USB memory interface, or other non-transitory computer-readable memory adapted for interfacing with a wireless terminal. When the programs are to be run, they may be loaded either from their distribution medium or their intermediate storage medium into the execution memory of a wireless terminal, configuring an onboard digital computer system (e.g. a microprocessor) to act in accordance with the disclosed methods. All these operations are well known to those skilled in the art of computer systems.

The term "computer-readable medium" encompasses distribution media, intermediate storage media, execution memory of a computer, and any other medium or device capable of storing for later reading by a digital computer system a computer program implementing the methods of the disclosure.

Various digital computer system configurations can be employed to perform the methods disclosed herein, and to the extent that a particular system configuration is capable of performing the disclosed methods, it is equivalent to the representative system aspects disclosed herein.

Once digital computer systems are programmed to perform particular functions pursuant to instructions from program software that implements the methods disclosed herein, such digital computer systems in effect become special-purpose computers particular to the methods. The techniques necessary for this programming are well known to those skilled in the art of computer systems.

Various embodiments disclosed herein may include variations in system configurations and the order of steps in which methods are provided. In many cases, multiple steps and/or multiple components may be consolidated.

All examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

Any element expressed herein as a means for performing a specified function is intended to encompass any way of performing that function including, for example, a combination of circuit elements which performs that function, or software in any form, including, therefore, firmware, microcode or the like, combined with appropriate circuitry for executing that software to perform the function. Embodiments of the invention as described herein reside in the fact that the functionalities provided by the various recited means are combined and brought together in the manner which the operational descriptions call for. Applicant regards any means that can provide those functionalities as equivalent to those shown herein.

The invention claimed is:

1. A method performed by a network node, comprising:
    collaborating with at least one other node to simultaneously monitor a requesting node petitioning for network access;
    collaborating with the at least one other node to perform a consensus-based threat analysis to identify a threat; and
    performing a countermeasure against the threat;
    wherein the network node's role in performing at least one of a set of functions is based on a hierarchy of trustworthiness levels, the set comprising: monitoring other nodes; sending alerts when anomalous behavior is detected; transmitting a free-antibody software program to the requesting node; updating defensive programs; participating in consensus-based threat analysis with other nodes; identifying threats; tagging suspicious nodes; and performing countermeasures against identified threats.

2. The method recited in claim 1, further comprising installing the free-antibody software program on the requesting node.

3. The method recited in claim 1, wherein the free-antibody software program is configured for performing at least one of a set of functions, the set comprising detecting malware on the requesting node, disabling malware on the requesting node, and disrupting the requesting node's access to the network.

4. The method recited in claim 1, wherein the network node comprises a sniffer for monitoring network traffic between other network nodes.

5. The method recited in claim 1, wherein the network node's role is configured according to one of a plurality of isotypes based on the network node's trustworthiness, an isotype corresponding to low trustworthiness having limited functionality relative to an isotype corresponding to higher trustworthiness.

6. The method recited in claim 1, further comprising updating at least one of an attack signature database and anti-malware software.

7. The method recited in claim 1, further comprising pushing a free-antibody software program to a requesting node petitioning to access the distributed network, the free-antibody software program configured to monitor behavior of the requesting node and detect at least one of malware and suspicious activity.

8. The method recited in claim 1, further comprising updating the requesting node's trustworthiness in a Network Wiki knowledge system.

9. The method recited in claim 8, wherein updates to the requesting node's trustworthiness are amplified by a consensus.

10. The method recited in claim 8, wherein trustworthiness comprises at least one of a measure of the requesting node's health and the requesting node's reliability.

11. The method recited in claim 1, wherein the network node employs a sniffer to monitor the requesting node.

12. The method recited in claim 1, further comprising generating at least one of macroscopic network-management messages and microscopic network-management messages.

13. The method recited in claim 1, further comprising employing a genetic algorithm to assign network-administration functions of varying importance to nodes having varying degrees of trustworthiness.

14. A computer program product, comprising a computer readable hardware storage device having computer readable program code stored therein, said program code containing instructions executable by one or more processors of a computer system residing on at least one network node to implement a method comprising:
    collaborating with at least one other node to simultaneously monitor a requesting node petitioning for network access;
    collaborating with the at least one other node to perform a consensus-based threat analysis to identify a threat; and
    performing a countermeasure against the threat;
    wherein the at least one network node's role in performing at least one of a set of functions is based on a hierarchy of trustworthiness levels, the set comprising: monitoring other nodes; sending alerts when anomalous behavior is detected; transmitting a free-antibody software program to the requesting node; updating defensive programs; participating in consensus-based threat analysis with other nodes; identifying threats; tagging suspicious nodes; and performing countermeasures against identified threats.

15. The computer program product recited in claim 14, further comprising installing the free-antibody software program on the requesting node.

16. The computer program product recited in claim 14, wherein the free-antibody software program is configured for performing at least one of a set of functions, the set comprising detecting malware on the requesting node, disabling malware on the requesting node, and disrupting the requesting node's access to the network.

17. The computer program product recited in claim 14, wherein the at least one network node comprises a sniffer for monitoring network traffic between other network nodes.

18. The computer program product recited in claim 14, wherein the at least one network node's role is configured according to one of a plurality of isotypes based on the at least one network node's trustworthiness, an isotype corresponding to low trustworthiness having limited functionality relative to an isotype corresponding to higher trustworthiness.

19. The computer program product recited in claim 14, further comprising updating at least one of an attack signature database and anti-malware software.

20. The computer program product recited in claim 14, wherein the free-antibody software program is configured to monitor behavior of the requesting node and detect at least one of malware and suspicious activity.

21. The computer program product recited in claim 14, further comprising updating the requesting node's trustworthiness in a Network Wiki knowledge system.

22. The computer program product recited in claim 21, wherein updates to the requesting node's trustworthiness are amplified by a consensus.

23. The computer program product recited in claim 21, wherein trustworthiness comprises at least one of a measure of the requesting node's health and the requesting node's reliability.

24. The computer program product recited in claim 14, wherein the at least one network node employs a sniffer to monitor the requesting node.

25. The computer program product recited in claim 14, further comprising generating at least one of macroscopic network-management messages and microscopic network-management messages.

26. The computer program product recited in claim 14, further comprising employing a genetic algorithm to assign network-administration functions of varying importance to nodes having varying degrees of trustworthiness.

* * * * *